United States Patent
Seitz et al.

(10) Patent No.: US 10,712,839 B2
(45) Date of Patent: Jul. 14, 2020

(54) ROTARY DIAL

(71) Applicant: eBay Inc., San Jose, CA (US)

(72) Inventors: Sarah Seitz, San Jose, CA (US); Shawn Piper, Beaverton, OR (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/049,808

(22) Filed: Jul. 30, 2018

(65) Prior Publication Data

US 2018/0335858 A1  Nov. 22, 2018

Related U.S. Application Data

(63) Continuation of application No. 15/097,864, filed on Apr. 13, 2016, now Pat. No. 10,073,547.

(60) Provisional application No. 62/168,427, filed on May 29, 2015.

(51) Int. Cl.
| | | |
|---|---|---|
| *G06F 3/0362* | (2013.01) | |
| *G06Q 30/06* | (2012.01) | |
| *G06Q 30/08* | (2012.01) | |
| *G06F 3/0484* | (2013.01) | |
| *G06F 3/0488* | (2013.01) | |

(52) U.S. Cl.
CPC .......... *G06F 3/0362* (2013.01); *G06F 3/0488* (2013.01); *G06F 3/04847* (2013.01); *G06Q 30/0603* (2013.01); *G06Q 30/0633* (2013.01); *G06Q 30/0643* (2013.01); *G06Q 30/08* (2013.01)

(58) Field of Classification Search
CPC .. G06F 3/0362; G06F 3/04847; G06F 3/0488; G06F 1/163; G06F 3/0484–04845; G06F 3/0485; G06Q 30/0633; G06Q 30/0643; G06Q 30/08; G06Q 30/0601; G06Q 40/04; G06Q 30/0603
See application file for complete search history.

(56) References Cited

U.S. PATENT DOCUMENTS

| | | | |
|---|---|---|---|
| 7,080,324 B1 * | 7/2006 | Nelson | G06F 3/04847 715/771 |
| 10,073,547 B2 | 9/2018 | Seitz et al. | |
| 10,088,809 B2 * | 10/2018 | Lee | G04G 21/08 |
| 2001/0043198 A1 * | 11/2001 | Ludtke | G06F 3/04847 345/173 |

(Continued)

OTHER PUBLICATIONS

Restriction Requirement received for U.S. Appl. No. 15/097,864, dated Aug. 15, 2017, 6 pages.

(Continued)

*Primary Examiner* — Xuemei Zheng
(74) *Attorney, Agent, or Firm* — SBMC

(57) ABSTRACT

Example embodiments described herein disclose a device configured to generate and cause display of a rotary input interface within a display of the device. The rotary input interface may be displayed as one or more dial types, including at least a continuous rotary dial, a horseshoe dial, or a continuous scroll wheel, configured to include an arrangement of values at positions along the rotary input interface. The rotary input interface also include a central display configured to indicate a selected value (e.g., from among the arrangement of values) based on a location of a value indicator among the arrangement of values.

20 Claims, 6 Drawing Sheets

(56) References Cited

U.S. PATENT DOCUMENTS

| | | | |
|---|---|---|---|
| 2002/0023039 A1* | 2/2002 | Fritsch | G06F 3/04847 |
| | | | 705/37 |
| 2007/0271528 A1 | 11/2007 | Park et al. | |
| 2014/0281993 A1* | 9/2014 | Hyde | H04N 21/2541 |
| | | | 715/719 |
| 2014/0365019 A1 | 12/2014 | Gourlay et al. | |
| 2015/0143282 A1* | 5/2015 | Telang | G06F 3/0487 |
| | | | 715/784 |
| 2016/0259488 A1* | 9/2016 | Chan | G06F 1/163 |
| 2016/0349859 A1 | 12/2016 | Seitz et al. | |
| 2017/0251186 A1* | 8/2017 | Ku | G02B 26/101 |

OTHER PUBLICATIONS

Response to Restriction Requirement filed on Sep. 13, 2017, for U.S. Appl. No. 15/097,864, dated Aug. 15, 2017, 8 pages.

Pre-Interview First Office Action received for U.S. Appl. No. 15/097,864, dated Oct. 18, 2017, 4 pages.

Applicant Initiated Interview Summary received for U.S. Appl. No. 15/097,864, dated Jan. 16, 2018, 3 pages.

First Action Interview—Office Action received for U.S. Appl. No. 15/097,864, dated Jan. 18, 2018, 4 pages.

Response to First Action Interview—Office Action filed on Mar. 16, 2018, for U.S. Appl. No. 15/097,864, dated Jan. 18, 2018, 15 pages.

Notice of Allowance received for U.S. Appl. No. 15/097,864, dated May 25, 2018, 8 pages.

\* cited by examiner

ROTARY DIAL

CLAIM OF PRIORITY

This application is a continuation of and claims priority to U.S. patent application Ser. No. 15/097,864, filed Apr. 13, 2016, which claims priority to U.S. Provisional Application Ser. No. 62/168,427, filed on May 29, 2015, the disclosures of which are incorporated by reference herein in their entirety.

TECHNICAL FIELD

The subject matter disclosed herein generally relates to machines configured for processing data. Specifically, the present disclosure addresses machines and methods that facilitate presenting an input interface on a wearable device.

BACKGROUND

Wearable devices, such as watches or other wrist-worn devices, are by their nature relatively small in size, thereby limiting a useable area for presenting interfaces configured for larger screen sizes. Thus, an electronic wearable portable device with multiple functions, such as data display, email, text messaging, and wireless communication, requires a practical means for a user to interact with the device to input data. Due to a form factor of the device, a keyboard or other button based user interface is neither practical nor possible in many instances.

BRIEF DESCRIPTION OF THE DRAWINGS

Some embodiments are illustrated by way of example and not limitation in the figures of the accompanying drawings in which.

DETAILED DESCRIPTION

Figure 1:
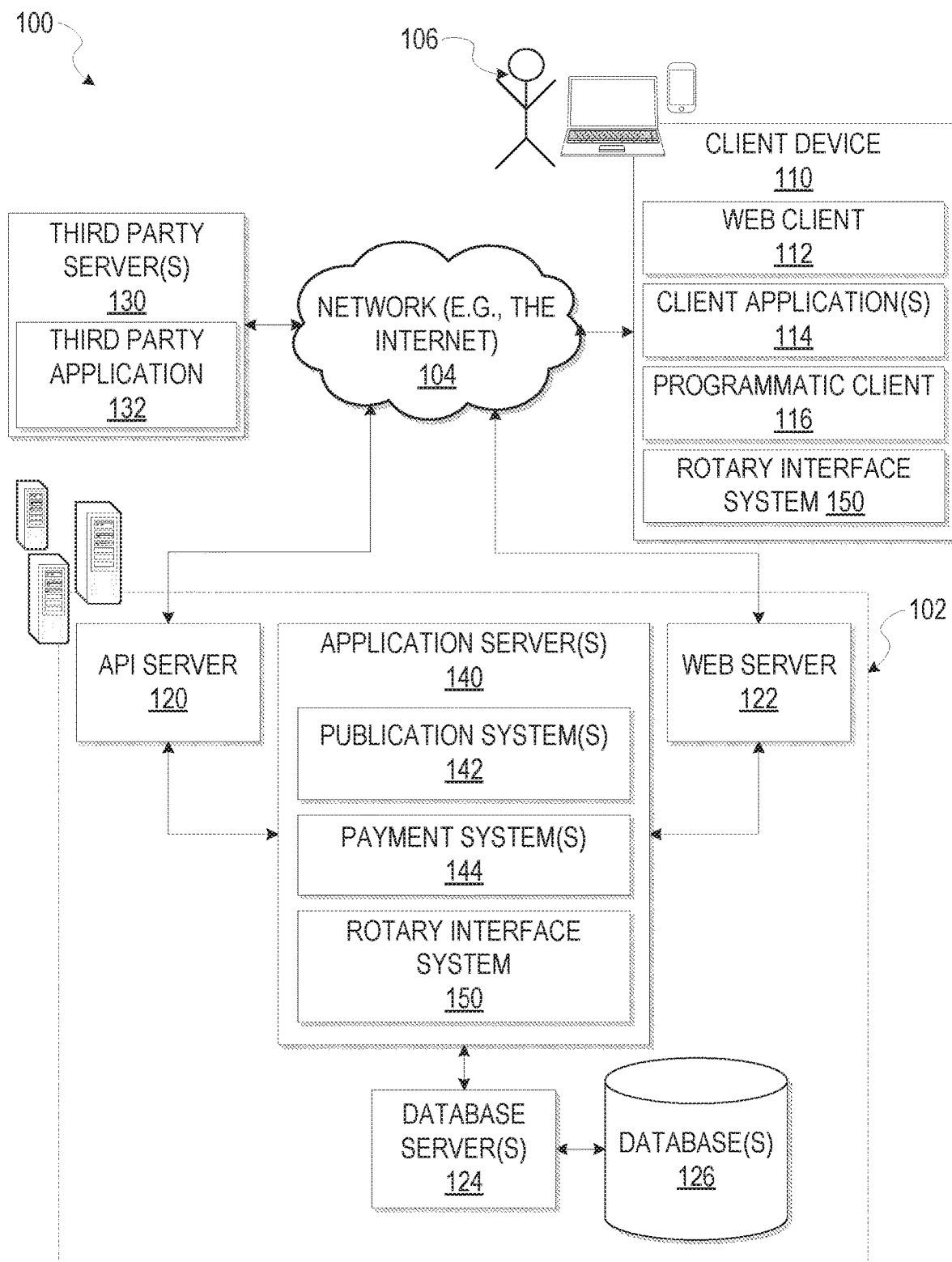
FIG. 1 is a network diagram depicting a client-server system, within which one example embodiment may be deployed.

Reference will now be made in detail to specific example embodiments for carrying out the inventive subject matter. Embodiments may be practiced without some or all of these details. It will be understood that the forgoing disclosure is not intended to limit the scope of the claims to the described embodiments. On the contrary, it is intended to cover alternatives, modifications, and equivalents as may be included within the scope of the disclosure as defined by the appended claims. In addition, well known features may not have been described in detail to avoid unnecessarily obscuring the subject matter.

Example embodiments described herein disclose a device (e.g., wrist-worn wearable device) configured to generate and cause display of a rotary input interface within a display of the device. The rotary input interface may be displayed as one or more dial types, including at least a continuous rotary dial, a horseshoe dial, or a continuous scroll wheel, configured to include an arrangement of values at positions along the rotary input interface. The rotary input interface also include a central display configured to indicate a selected value (e.g., from among the arrangement of values) based on a location of a value indicator among the arrangement of values.

In some example embodiments, the rotary input interface is configured to display a continuous rotary dial having no defined maximum or minimum values. The continuous rotary dial includes an arrangement of markings (e.g., points, hash-marks, dots, numerals) arranged along a circumference of the rotary input interface indicating consecutive values. Additionally, the rotary input interface may further display the value indicator at a stationary position along the circumference of the rotary input interface. The relative location of the value indicator among the arrangement of values indicates a selected value to be displayed within the central display from among the arrangement of values, as the selected value transgresses a threshold defined by the stationary position of the value indicator.

In some example embodiments, the rotary input interface is configured to display a horseshoe dial, with a first end and a second end, having a defined minimum value (e.g., at the first end) and a defined maximum value (e.g., at the second end). The horseshoe dial may display the value indicator at a movable position along a border of the horseshoe dial, such that a received user input (e.g., a recognized gesture) may move the value indicator from a first position to a second position among the arrangement of values. Thus, as the value indicator is moved from a first position to a second position along the border of the horseshoe dial, the central display updates (e.g., from a value defined by the first position) in real time to display a value defined by the second position.

In some example embodiments, the rotary input interface is configured to display a continuous scroll wheel, such that the continuous scroll wheel includes an arrangement of values having no defined minimum or maximum points. The continuous scroll wheel may also include the value indicator at a fixed (e.g., stationary) position along the arrangement of values, such that as a first value from among the arrangement of values transgresses a threshold defined by the location of the value indicator, a value displayed within the central display is updated to correspond to the first value.

The rotary input interface receives user inputs as recognized gestures via a touch enabled display of the device. For example, a first gesture indicating a clock-wise rotation of the continuous rotary dial indicates a decrease in the selected value, while a second gesture indicating a counter clock-wise rotation of the continuous rotary dial indicates an increase in the selected value (or vice-versa). Similarly, and with respect to the continuous scroll wheel, a first gesture indicating upward movement of the continuous scroll wheel may indicate a decrease in the selected value, while a second gesture indicating downward movement of the scroll wheel may indicate an increase in the selected value (or vice versa). As the selected value is changed based on the location of the value indicator among the arrangement of values, the central display updates (e.g., change in real time) in accordance with the selected value indicated by the location of the value indicator.

With reference to FIG. 1, an example embodiment of a high-level client-server-based network architecture 100 is shown. A networked system 102, in the example forms of a network-based publication or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), a client application 114, and a programmatic client 116 executing on the client device 110.

The client device 110 may comprise, but is not limited to, a wearable device, mobile phone, desktop computer, laptop, portable digital assistant (PDA), smart phone, tablet, ultrabook, netbook, laptop, multi-processor system, microprocessor-based or programmable consumer electronics, game console, set-top box, or any other communication device that a user may utilize to access the networked system 102. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based publication system that responds to requests for product listings, publishes publications comprising item listings of products available on the network-based publication system, and manages payments for these transactions. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may include one or more client applications 114 (also referred to as "apps") such as, but not limited to, a web browser, messaging application, electronic mail (email) application, an e-commerce site application (also referred to as a marketplace application), and the like. In some embodiments, if the e-commerce site application is included in the client device 110, then this client application 114 is configured to locally provide the user interface and at least some of the functionalities with the client application 114 configured to communicate with the networked system 102, on an as needed basis, for data or processing capabilities not locally available (e.g., access to a database of items available for sale, to authenticate a user, to verify a method of payment). Conversely, if the e-commerce site application is not included in the client device 110, the client device 110 may use its web browser to access the e-commerce site (or a variant thereof) hosted on the networked system 102.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, publication, marketplace, or payment functions that are supported by the relevant applications of the networked system 102.

The publication systems 142 provides a number of publication functions and services to the users 106 that access the networked system 102. The payment systems 144 likewise provides a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

A rotary interface system 150 provides functionality operable to perform various functions to receive user inputs to select a value among an arrangement of values presented within the rotary input interface at a device (e.g., a wrist worn wearable device), according to some example embodiments. For example, the rotary interface system 150 causes display of a rotary input interface that includes an arrangement of values, a central display element, and a value indicator at a location within the rotary input interface, and receives one or more user inputs adjusting the rotary dial interface to cause display of a desired value (e.g., a numerical value) within the central display element. In some example embodiments, the rotary interface system 150 is a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system 142, payment system 144, and rotary interface system 150 could also be implemented as standalone software programs, which do not necessarily have networking capabilities.

The web client 112 may access the various publication and payment systems 142 and 144 via the web interface supported by the web server 122. Similarly, the programmatic client 116 accesses the various services and functions provided by the publication and payment systems 142 and 144 via the programmatic interface provided by the API server 120. The programmatic client 116 may, for example, be a seller application (e.g., the Turbo Lister application developed by eBay® Inc., of San Jose, Calif.) to enable sellers to author and manage listings on the networked system 102 in an off-line manner, and to perform batch-mode communications between the programmatic client 116 and the networked system 102.

Figure 2:
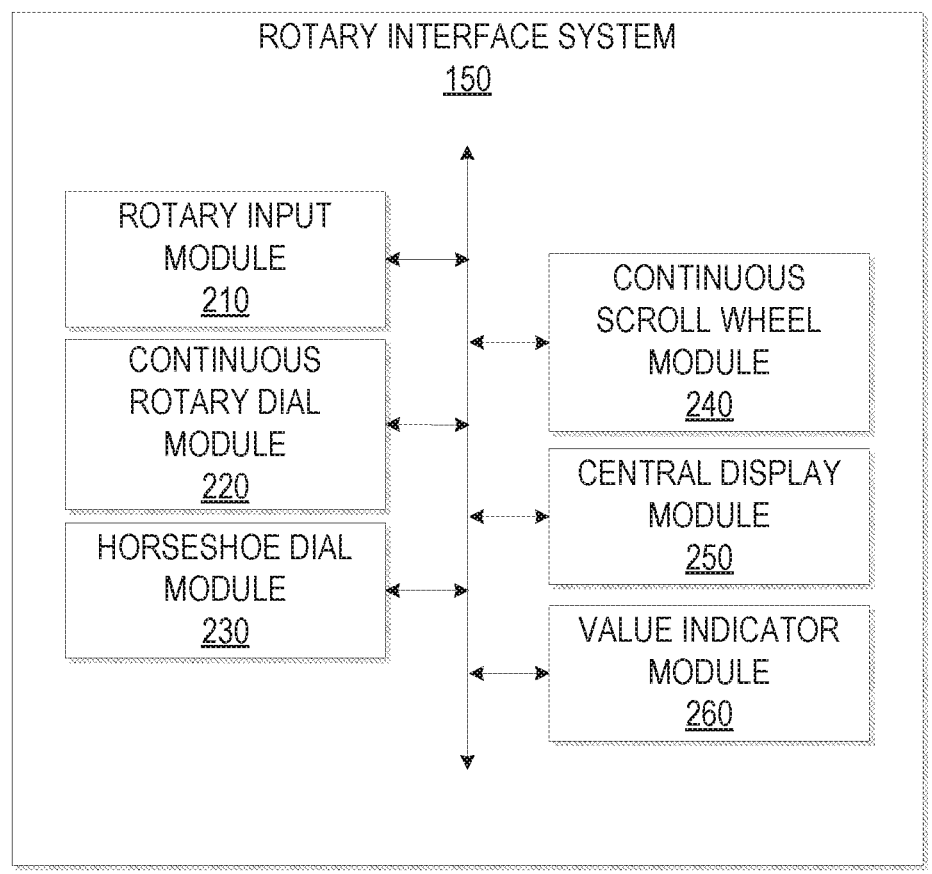
FIG. 2 is a block diagram illustrating various modules of the rotary interface system, according to some example embodiments.

FIG. 2 is a block diagram illustrating various functional modules of the rotary interface system 150 consistent with some embodiments. The rotary interface system 150 is shown as including: a rotary input module 210; a continuous rotary dial module 220; a horseshoe dial module 230; a continuous scroll wheel module 240; a central display module 250; and a value indicator module 260. The various modules of the rotary interface system 150 may, furthermore, access the database 126 via the database server 124, and each of the various modules of the rotary interface system 150 may be in communication with one or more of the third party applications 132 (e.g., a social network platform). Further, while the modules of FIG. 2 are discussed in the singular sense, it will be appreciated that, in other embodiments, multiple modules may be employed.

Any one or more of the modules described may be implemented using hardware alone (e.g., one or more of the processors of a machine) or a combination of hardware and software. For example, any module described in the rotary interface system 150 may physically include an arrangement of one or more of the processors (e.g., a subset of or among the one or more processors of the machine) configured to perform the operations described herein for that module. As another example, any module of the rotary interface system 150 may include software, hardware, or both, that configures an arrangement of one or more processors (e.g., among the one or more processors of the machine) to perform the operations described herein for that module. Accordingly, different modules of the rotary interface system 150 includes and configures different arrangements of such processors or a single arrangement of such processors at different points in time. Moreover, any two or more modules of the rotary interface system 150 may be combined into a single module, and the functions described herein for a single module may be subdivided among multiple modules. Furthermore, according to various example embodiments, modules described herein as being implemented within a single machine, database 126, or device or may be distributed across multiple machines, databases 126, or devices.

The rotary input module 210 is configured to generate and cause display of a rotary input interface at a device (e.g., client device 110). According to various example embodiments, the rotary input interface may include an arrangement of one or more values, a value indicator (e.g., at a fixed or movable position), and a central display element configured to present a value from among the arrangement of values indicated by a position of the value indicator.

The continuous rotary dial module 220 is configured to generate and cause the rotary input interface to display as a continuous rotary dial interface, having no defined maximum or minimum values (e.g., a continuous rotatable dial). The continuous rotary dial interface includes an arrangement of markings (e.g., hash-marks, dots, numerals) arranged along a circumference of the rotary input interface, indicating increasing consecutive values. Additionally, the continuous rotary dial module 220 causes the rotary input interface to display the value indicator at a stationary position along the circumference of the rotary input interface, such that the arrangement of marking may change orientation to adjust the selected value.

The horseshoe module 230 is configured to generate and cause the rotary input interface to display as a horseshoe dial element within the GUI with a first end and a second end having defined minimum values (e.g., at the first end) and maximum values (e.g., at the second end). The horseshoe dial module 230 may cause display of the value indicator at a movable position along a border of the horseshoe dial element, such that a received user input (e.g., a recognized gesture) may move the value indicator from a first position to a second position among the arrangement of values. Thus, as the value indicator is moved from a first position to a second position along the border of the horseshoe dial, the central display updates (e.g., from a value defined by the first position) in real time to display a value defined by the second position.

The continuous scroll wheel module 240 is causes the rotary dial interface to display as a continuous scroll wheel that includes an arrangement of values with no defined minimum or maximum points. The continuous scroll wheel module 240 causes the value indicator to display at a fixed (e.g., stationary) position among the arrangement of values within the rotary input interface, such that as a first value from among the arrangement of values transgresses a threshold defined by the location of the value indicator, a value displayed within the central display is updated to correspond to the first value.

The central display module 250 is configured to generate and cause display of a central display at a location within the rotary input interface. The central display presents a selected value based on a location of the value indicator with respect to the arrangement of values displayed within the rotary input interface. For example, as a first value (e.g., from among the assortment of values) transgresses a threshold defined by a location of the value indicator within the rotary input interface, the central display module 250 receives and causes display of the first value within the central display. In some example embodiments, the central display module updates a displayed value in real time. In further embodiments, the central display module 250 causes the central display to update based on a received user input requesting that the central display update to indicate a specified value from among the arrangement of values.

The value indicator module 260 is configured to generate and cause display of a value indicator within the rotary input interface. The value indicator may be presented as a graphical element at a stationary or movable location among the arrangement of values. The value indicator identifies a selected value from among the arrangement of values presented within the rotary input interface. In some example embodiments, the value indicator module 260 is configured to receive one or more user inputs moving the value indicator from a first location among the arrangement of values within the rotary input interface to a second location.

Figure 3:
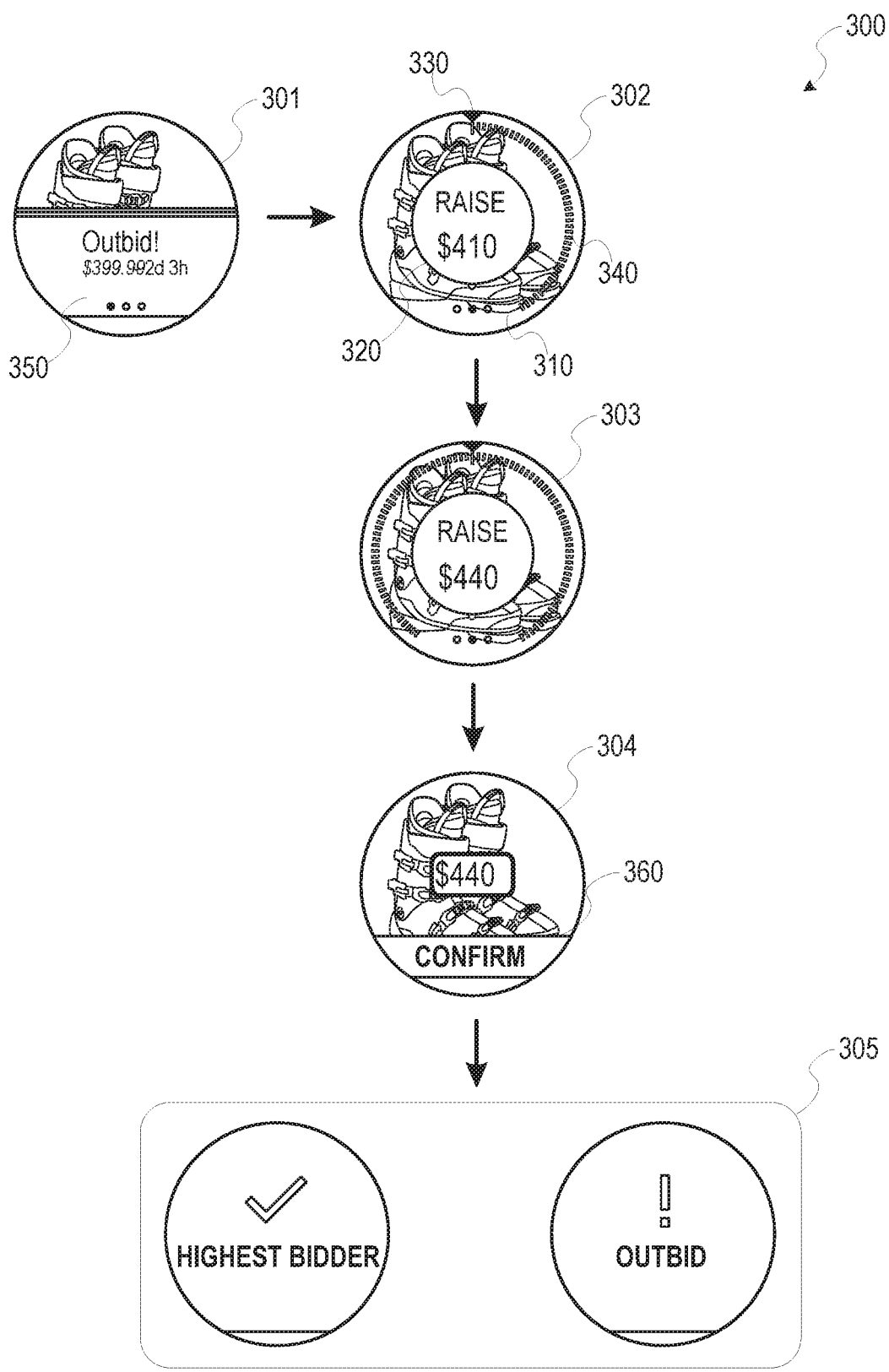
FIG. 3 depicts a flow diagram illustrating a rotary dial interface presented as a continuous rotary dial, and configured to receive one or more user inputs adjusting a value presented within a central display of a graphical user interface, according to various example embodiments.

FIG. 3 depicts a flow diagram illustrating various states of a rotary input interface 310 presented as a continuous rotary dial, and configured to receive one or more user inputs adjusting a value presented within a central display element 320 of the rotary input interface 310, according to various example embodiments. As illustrated in FIG. 3, the value indicator may be depicted as a pointer 330 at a fixed location at the 12 o'clock position within the rotary input interface 310, such the arrangement of values 340 may be reoriented relative to the value indicator. FIG. 3 illustrates one or more interface states 1, 2, 3, 4, 5, and 6 depicting various embodiments of the rotary input interface 310, according to some example embodiments.

According to some example embodiments, the value indicator (e.g., pointer 330) is displayed at a starting locating corresponding to a minimum value (e.g., $410). As depicted in FIG. 3, the minimum value may be based on a starting bid value of an item retrieved from an item listing page for the item presented in an online auction. A user of the client device 110 may have previously indicated an interest in the item by searching for the item or bidding on the item. For example, as seen in interface state 301 of FIG. 3, the user 106 may be presented with a notification 350 at the client device 110 indicating that a bid previously provided by the user 106 has been outbid.

In response to receiving the notification 350, at interface state 302, the rotary input interface 310 displays the pointer 330 at a starting location defined by the minimum value (e.g., $410). In some example embodiments, only a portion of the arrangement of values 340 is displayed. For example, the displayed portion of the arrangement of values 340 may include a range of values greater than a threshold defined by the minimum value. A user 106 provides a user input (e.g., a tactile input through a touch enabled device) that changes an orientation of the arrangement of values 340 (e.g., by a user input twisting, or turning the dial) with respect to the value indicator (e.g., the pointer 330), to define a second selected value. Upon receiving the second selected value, the rotary input interface 310 proceeds to interface state 303, and updates the central display element 320 within the rotary input interface 310 based on the second selected value (e.g., $440) from the arrangement of values 340.

Responsive to receiving the second selected value, the rotary interface system 150 updates to display interface state 304 to present a confirmation interface 360 to transmit the second selected value as a new bid amount on the item. In some example embodiments, the rotary interface system 150 may update the rotary input interface 310 to display interface state 305, to display a bid status. The bid status may indicate that the user 106 is the highest bidder, or if the user 106 has been outbid.

Figure 4:
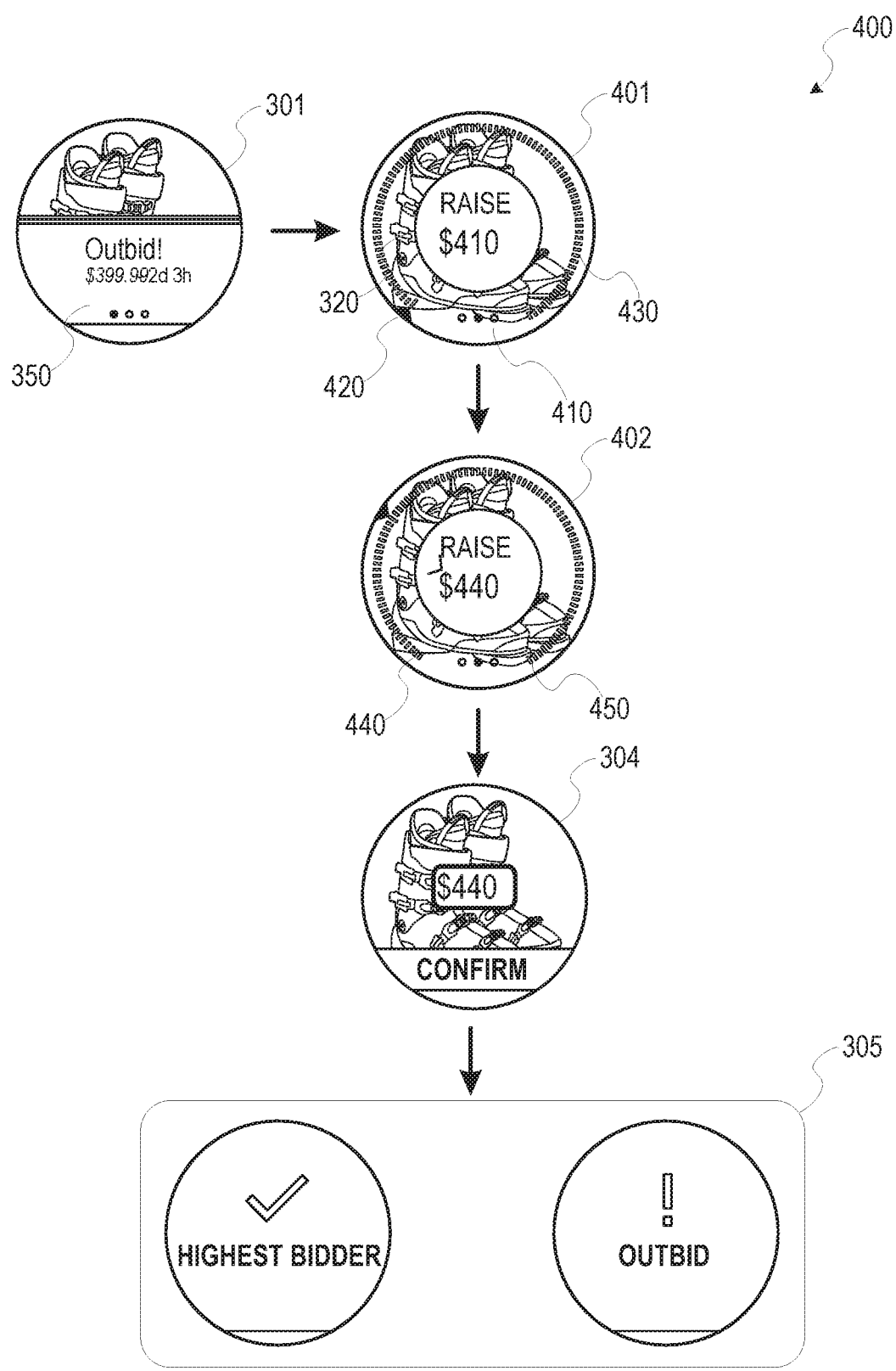
FIG. 4 depicts a flow diagram illustrating a rotary dial interface presented as a horseshoe dial, and configured to receive one or more user inputs adjusting a value presented within a central display of a graphical user interface, according to various example embodiments.

FIG. 4 depicts a flow diagram 300 illustrating various states of a rotary input interface presented as a horseshoe dial, and configured to receive one or more user inputs adjusting a value presented within a central display element 320 of the rotary input interface 410, according to various example embodiments. As illustrated in FIG. 4, the value indicator may be depicted as a pointer 420 at a first movable location among the arrangement of values 430 displayed within the rotary input interface 410, and configured to receive a user input moving the pointer 420 from the first movable location to a second location among the arrangement of values 430. As seen in FIG. 4, the arrangement of values 430 have a first end 440 that corresponds to the minimum value, and a second end 450 that corresponds to a maximum value.

According to some example embodiments the pointer 420 is displayed at a starting location (e.g., the first end 440) within the rotary input interface 410 that corresponds to a minimum value (e.g., $410). As depicted in FIG. 4 (and as previously described in FIG. 3), the minimum value may be based on a starting bid value of an item retrieved from an item listing page for the item presented in an online auction.

As in FIG. 3, at interface state 301 of FIG. 3, the user 106 may be presented with a notification 350 at the client device 110 indicating that a bid previously provided by the user 106 has been outbid. In response to receiving the notification 350, at interface state 401, the rotary input interface 410 displays the pointer 420 at a starting location defined by the minimum value. A user 106 provides a user input (e.g., a tactile input through a touch enabled device) to adjust a position of the pointer 420 among the arrangement of values 430 (e.g., by a user input moving the pointer to a second location among the arrangement of values), to define a second selected value 450. Upon receiving the second selected value 450, the rotary input interface 410 proceeds to interface state 402, and updates the central display element 320 within the rotary input interface 310 based on the second selected value 450 (e.g., $440). As in FIG. 3, in some example embodiments, the rotary interface system 150 may update the rotary input interface 310 to display interface state 305, to display a bid status. The bid status may indicate that the user 106 is the highest bidder, or if the user 106 has been outbid.

Figure 5:
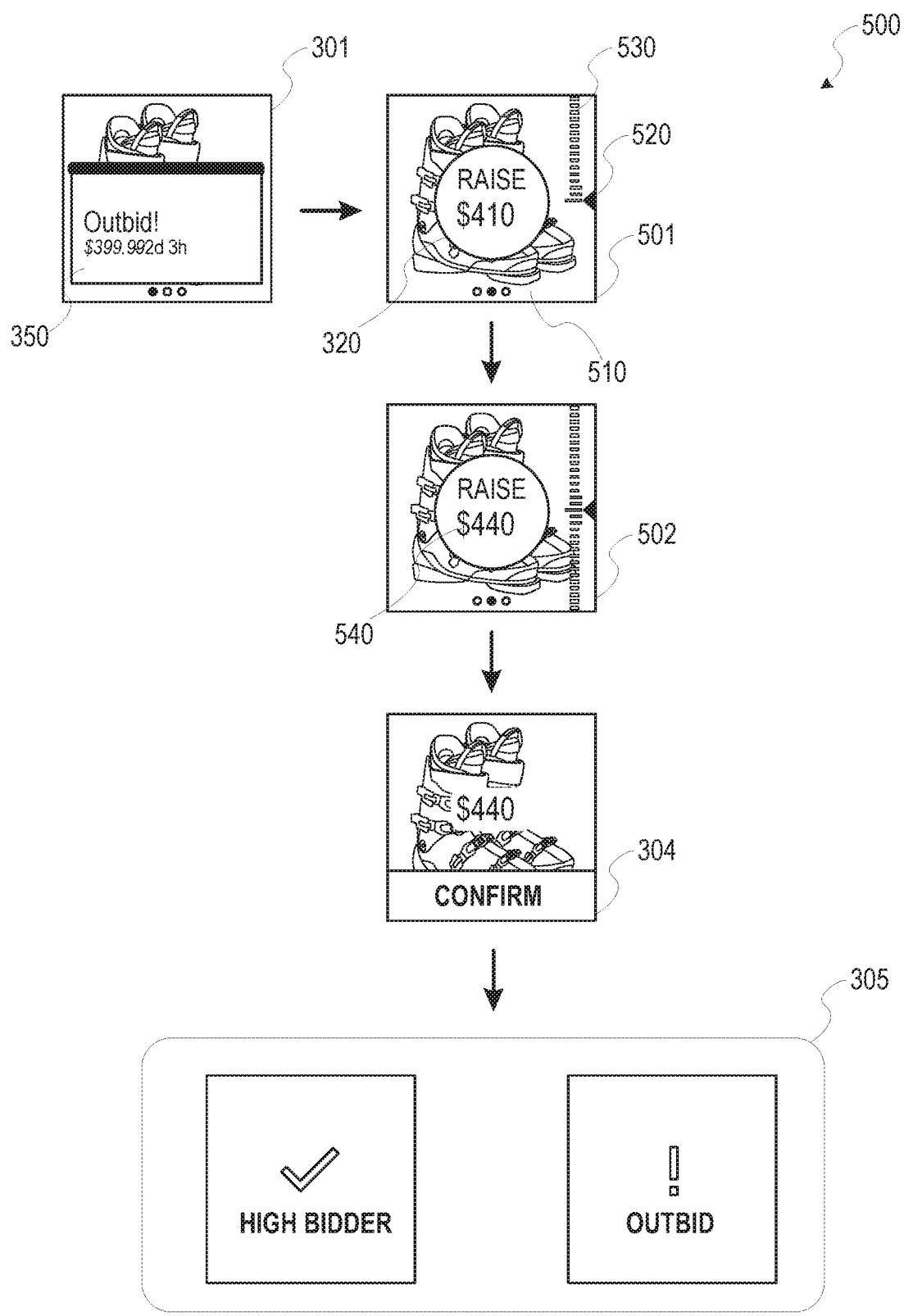
FIG. 5 depicts a flow diagram illustrating a rotary dial interface presented as a continuous scroll wheel, and configured to receive one or more user inputs adjusting a value presented within a central display of a graphical user interface, according to various example embodiments.

FIG. 5 depicts a flow diagram 300 illustrating various states of a rotary input interface 510 presented as a continuous scroll wheel, and configured to receive one or more user inputs adjusting a value presented within a central display element 320, according to various example embodiments. As illustrated in FIG. 5, the value indicator may be depicted as a pointer 520 at a fixed location within the rotary input interface 510. As a user moves the arrangement of values 530 (e.g., by a user moving the values up or down), the rotary input interface 510 updates the selected value (e.g., $410) displayed within the central display element 320 accordingly.

According to some example embodiments the pointer 520 is displayed at a starting location 540 of the rotary input interface 510 that corresponds to a minimum value (e.g., $410). As depicted in FIG. 5 (and as previously described in FIG. 3 and FIG. 4), the minimum value may be based on a starting bid value of an item retrieved from an item listing page for the item presented in an online auction.

As in FIG. 3, at interface state 301 of FIG. 3, the user 106 may be presented with a notification 350 at the client device 110 indicating that a bid previously provided by the user 106 has been outbid. At interface state 501, the rotary input interface 510 displays the pointer 520 at a starting location defined by the minimum value. A user 106 provides a user input (e.g., a tactile input through a touch enabled device) to adjust an orientation of the continuous scroll wheel of the rotary input interface 510. Upon receiving the second selected value based on the orientation of the continuous scroll wheel of the rotary input interface 510, the rotary input interface 510 proceeds to interface state 502, and updates the central display element 320 based on the second selected value 450 (e.g., $440). At interface state 503, the rotary input interface 510 updates to display a bid confirmation page. As in FIG. 3, in some example embodiments, the rotary interface system 150 may update the rotary input interface 510 to display interface state 305, to display a bid status. The bid status may indicate that the user 106 is the highest bidder, or if the user 106 has been outbid.

Example Machine Architecture and Machine-Readable Medium

Figure 6:
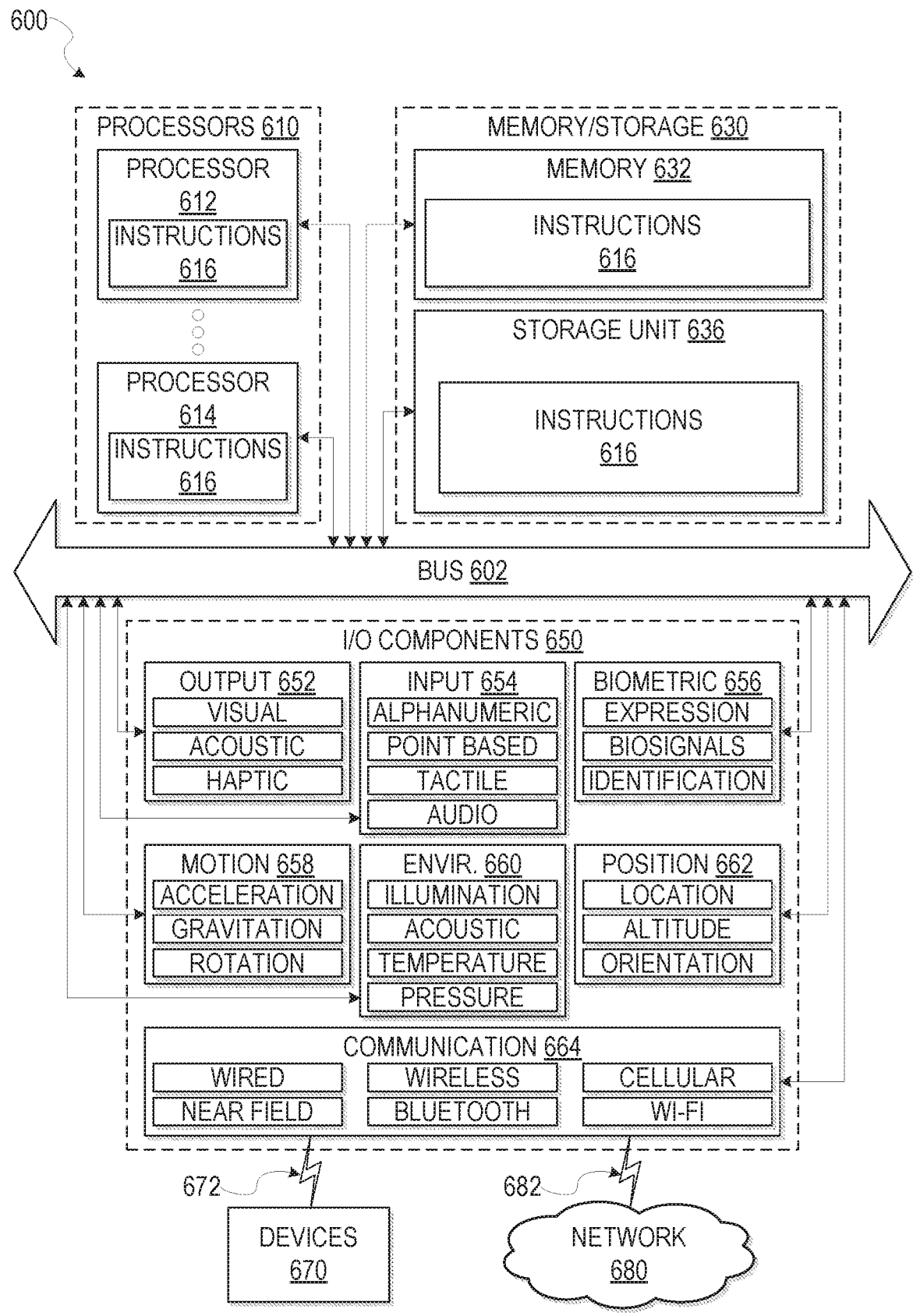
FIG. 6 is a diagrammatic representation of a machine in the example form of a computer system within which a set of instructions, for causing the machine to perform any one or more of the methodologies discussed herein, may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. Additionally, or alternatively, the instructions may implement the modules of FIG. 2. The instructions transform the general, non-programmed machine into a specially configured machine programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment.

The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

The machine 600 includes processors 610, memory 630, and I/O components 650, which may be configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670. The term "transmission medium" shall be taken to include any intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
generating a scrolling input interface, the scrolling input interface being rectangular and including a value indicator at a first position of the scrolling input interface and an assortment of scrollable values arranged vertically along the scrolling input interface, the assortment of scrollable values being scrollable in relation to the value indicator, the assortment of scrollable values further being associated with an adjustable attribute of a listing that is included with other listings in a store of information, the scrolling input interface further including a central display indicating a first selected value from among the assortment of scrollable values, the first selected value selected for the adjustable attribute of the listing based on location of the value indicator relative to the first selected value;
receiving a second selected value from among the assortment of scrollable values, the receiving responsive to a user input that scrolls the assortment of scrollable values from a first orientation to a second orientation, wherein at the first orientation the first selected value is at the first position along the scrolling input interface, and at the second orientation the second selected value is at the first position along the scrolling input interface; and
updating the central display to indicate that the adjustable attribute of the listing is adjusted to the second selected value.

2. The method as described in claim 1, wherein the assortment of scrollable values are arranged sequentially along a first side of the scrolling input interface.

3. The method as described in claim 1, wherein the assortment of scrollable values are arranged sequentially and in a column along a first side of the scrolling input interface.

4. The method as described in claim 1, further comprising:
causing display of the assortment of scrollable values as a set of points, each point among the set of points corresponding to a sequential value;
visually distinguishing a first range of points and a second range of points among the set of points, the first range of points and the second range of points divided by the first selected value, and the second selected value located among the second range of points; and
restricting the value indicator to the second range of points.

5. The method as described in claim 1, wherein the adjustable attribute is a price for purchasing a listed item.

6. The method as described in claim 1, wherein the adjustable attribute is a bid for purchasing a listed item via an online auction.

7. The method as described in claim 1, wherein the first selected value is a starting bid for a listed item and the second selected value is a new bid for the listed item.

8. The method as described in claim 1, further comprising retrieving a listing of a listed item from the store of information, the listing of the listed item including the first selected value.

9. A non-transitory machine-readable storage medium comprising instructions that, when executed by one or more processors of a device, cause the device to perform operations comprising:
generating a scrolling input interface, the scrolling input interface being rectangular and including a value indicator at a first position of the scrolling input interface and an assortment of scrollable values arranged vertically along the scrolling input interface, the assortment of scrollable values being scrollable in relation to the value indicator, the assortment of scrollable values further being associated with an attribute of a listing that is included with other listings in a store of information, the scrolling input interface further including a display element indicating a first selected value from among the assortment of scrollable values, the first selected value selected for the attribute of the listing based on location of the value indicator relative to the first selected value;
receiving a second selected value from among the assortment of scrollable values, the receiving responsive to a user input that scrolls the assortment of scrollable values from a first orientation to a second orientation, wherein at the first orientation the first selected value is at the first position along the scrolling input interface, and at the second orientation the second selected value is at the first position along the scrolling input interface; and
updating the display element to indicate that the attribute of the listing is adjusted to the second selected value.

10. The non-transitory machine-readable storage medium as described in claim 9, wherein the assortment of scrollable values are arranged sequentially along a first side of the scrolling input interface.

11. The non-transitory machine-readable storage medium as described in claim 9, wherein the operations further comprise:
causing display of the assortment of values as a set of points, each point among the set of points corresponding to a sequential value;

visually distinguishing a first range of points and a second range of points among the set of points, the first range of points and the second range of points divided by the first value, and the second selected value located among the second range of points; and restricting the value indicator to the second range of points.

12. The non-transitory machine-readable storage medium as described in claim 9, wherein the attribute is a purchase price of a listed item.

13. The non-transitory machine-readable storage medium as described in claim 9, wherein the operations further comprise retrieving a listing of a listed item from the store of information, the listing of the listed item including the first selected value.

14. A system comprising:
at least one processor; and
a memory storing instructions that, when executed by the at least one processor, cause the system to perform operations comprising:
generating a scrolling input interface, the scrolling input interface being rectangular and including a value indicator at a first position of the scrolling input interface and an assortment of scrollable values arranged vertically along the scrolling input interface, the assortment of scrollable values being scrollable in relation to the value indicator, the assortment of scrollable values further being associated with an attribute of a listing that is included with other listings in a store of information, the scrolling input interface further including a display element indicating a first selected value from among the assortment of scrollable values, the first selected value selected for the attribute of the listing based on location of the value indicator relative to the first selected value;

receiving a second selected value from among the assortment of scrollable values, the receiving responsive to a user input that scrolls the assortment of scrollable values from a first orientation to a second orientation, wherein at the first orientation the first selected value is at the first position along the scrolling input interface, and at the second orientation the second selected value is at the first position along the scrolling input interface; and updating the display element to indicate that the attribute of the listing is adjusted to the second selected value.

15. The system as described in claim 14, wherein receiving the second selected value includes receiving a touch input via a touch enabled display of the system and effective to scroll the assortment of scrollable values.

16. The system as described in claim 14, wherein receiving the second selected value includes receiving a user input that twists a dial of the system and effective to scroll the assortment of scrollable values.

17. The system as described in claim 14, wherein the system is implemented as a wearable device.

18. The system as described in claim 14, wherein the assortment of scrollable values are arranged sequentially along a first side of the scrolling input interface.

19. The system as described in claim 14, wherein the assortment of scrollable values are arranged sequentially and in a column along a first side of the scrolling input interface.

20. The system as described in claim 14, wherein the adjustable attribute is a price for purchasing a listed item.

* * * * *